United States Patent [19]

Longley et al.

[11] 4,110,268

[45] Aug. 29, 1978

[54] POLYETHER POLYOLS AND POLYURETHANE FOAMS MADE THEREFROM

[75] Inventors: Kermit D. Longley, Park Forest, Ill.; Robert Herke, Missouri City, Tex.; Robert J. Kufrin, Hinsdale, Ill.

[73] Assignee: Witco Chemical Corporation, New York, N.Y.

[21] Appl. No.: 726,861

[22] Filed: Sep. 27, 1976

[51] Int. Cl.$^2$ .................. C08G 18/14; C07C 41/12; C09K 3/00

[52] U.S. Cl. .................. 521/177; 252/182; 260/611.5; 260/613 R; 260/615 B; 521/121; 521/125; 521/174

[58] Field of Search .......... 260/2.5 AP, 2.5 AG, 260/2.5 AB, 611.5, 613 R, 615 B; 252/182

[56] References Cited

U.S. PATENT DOCUMENTS

| | | | |
|---|---|---|---|
| 3,000,963 | 9/1961 | Speranza | 260/615 B |
| 3,024,207 | 3/1962 | Shaw et al. | 260/2.5 AP |
| 3,030,425 | 4/1962 | Mills et al. | 260/611.5 |
| 3,075,927 | 1/1963 | Lanham | 260/2.5 AP |
| 3,299,151 | 1/1967 | Wismer et al. | 260/2.5 AP |
| 3,412,047 | 11/1968 | Shriver | 260/2.5 AP |
| 3,715,402 | 2/1973 | Louvar et al. | 260/615 B |
| 3,793,240 | 2/1974 | Smith et al. | 260/2.5 AG |
| 3,873,476 | 3/1975 | Jabs et al. | 260/2.5 AG |
| 4,029,879 | 6/1977 | Muzzio | 260/615 B |

*Primary Examiner*—H.S. Cockeram
*Attorney, Agent, or Firm*—Albert L. Gazzola; Morton Friedman

[57] ABSTRACT

In the preparation of normally liquid polyether polyols for use in the production of polyurethane foams, alkaline or basic catalysts, such as potassium hydroxide, which are employed in the process of preparing said polyether polyols, are neutralized with (a) oleic acid or with (b) oleic acid and higher molecular weight alkylbenzene or alkyltoluene sulfonic acids such as dodecylbenzene sulfonic acids and dodecyltoluene sulfonic acids, or such alkylnaphthalene sulfonic acids as butyl- or amylnaphthalene sulfonic acids, which results in a number of advantages, including reducing or eliminating purification procedures, producing polyether polyol compositions which have improved solubility, particularly in higher molecular weight polyols or polyol ethers and also in certain ingredients used in the polyurethane foam formulations in which said specially neutralized polyether polyols are used, and reducing catalyst costs in the process of producing polyurethane foams from said polyether polyol compositions.

24 Claims, No Drawings

POLYETHER POLYOLS AND POLYURETHANE FOAMS MADE THEREFROM

Our invention is directed to the preparation of normally liquid polyether polyols (which term is intended to include generically polyether glycols and polyethers of polyhydric alcohols containing at least 3 hydroxyl groups) and polyurethane foams made therefrom. By the term "normally liquid" we mean liquid at ordinary room temperatures, for instance, from about 25° to 30° C.

It is common practice, in the preparation of polyether polyols used in the production of polyurethane foams of rigid or flexible character, to prepare said polyether polyols by adducting dihydric or polyhydric alcohols with alkylene oxides, such as ethylene oxide or propylene oxide or both ethylene oxide and propylene oxide, in the presence of an alkaline or basic catalyst, sodium hydroxide, potassium hydroxide and other alkaline or basic catalysts such as quaternary ammonium bases and various amines having heretofore been suggested or employed, potassium hydroxide being most commonly utilized in commercial practice. After the adduction has been completed, it is common practice or known to the art to remove the alkaline catalyst by neutralization with acids or acidic materials such as phosphoric acid or carbon dioxide, or acidic ion exchange resins, or to effect such alkaline catalyst removal by precipitating it out, this being usually done, at least in those cases where, for instance, potassium hydroxide has been used as the catalyst, with oxalic acid. The resulting potassium oxalate is insoluble in the polyether polyol and it is reasonably readily removed by filtration or similar procedures. Unless the alkaline or basic catalyst is effectively destroyed either by neutralization as generally pointed out above or by removal through precipitation, a matter which is well known to those skilled in the art, the polyether polyols cannot satisfactorily be used for the production of polyurethane foams, particularly said foams made from higher molecular weight polyether polyols.

We have discovered that, where polyether polyols are made, for instance, as described above, in which an alkaline or basic catalyst is utilized and remains and is present when the preparation proper of the polyether polyol has been completed, if the said catalyst is neutralized as hereafter described, certain marked and significant advantages are obtained from a number of standpoints. We have discovered that when oleic acid, or oleic acid and a higher molecular weight alkylbenzene or alkyltoluene sulfonic acid or an alkylnaphthalene sulfonic acid such as butyl or amyl (which term includes isobutyl and isoamyl) naphthalene sulfonic acid, is used to neutralize the alkaline or basic catalyst, particularly where the catalyst used is potassium hydroxide, the resulting potassium oleate, or the resulting potassium oleate and potassium salt of the higher alkylbenzene or alkyltoluene sulfonates, or the alkylnaphthalene sulfonic acids, are soluble in the polyether polyols. We have also discovered that the resulting polyether polyol compositions, which contain the aforesaid neutralization products, can be used directly or as such in polyurethane formulations for reaction with di- or polyisocyanates for the production of polyurethane foams of good and commercially acceptable character. We have, further, discovered that, in many instances, when said so neutralized polyether polyol compositions are formulated to produce polyurethane foams, it is unnecessary to utilize extraneous catalysts in the polyurethane foam formulations or, where such catalysts are still required to produce satisfactory polyurethane foams, the amounts of said extraneous catalysts which are customarily employed in such polyurethane foam formulations can be reduced, in certain cases, very substantially, without sacrifice of the desirable properties and characteristics of the finished polyurethane foams produced from such formulations. This represents a significant economic savings because catalysts commonly used in polyurethane foam formulations are expensive and savings achieved by reducing the amounts required to be used in given formulations, taking into account the cost of the oleic acid, or the oleic acid and higher alkylbenzene or alkyltoluene sulfonic acids, or alkylnaphthalene sulfonic acids, are frequently quite appreciable, particularly where large volume production of polyurethane foams is involved.

In summary, therefore, our present invention possesses several advantages over present knowledge and present practices in the art in the following respects:

1. It avoids the necessity of effecting removal of the alkaline or basic catalyst remaining at the end of the process of producing the polyether polyols. Where, for instance, potassium hydroxide is used as the catalyst in the case of the production of the polyether polyols for use in the making of rigid polyurethane foams, the removal of the potassium hydroxide from the polyether polyol not infrequently entails appreciable loss of the polyether polyols.

2. It results in savings effected by reason of avoidance of the necessity for use of conventional expensive catalysts called for in various standard formulations for the production of polyurethane foams, or it reduces the amount of such expensive catalysts which the formulation calls for with an overall savings in catalyst cost, taking into account all relevant factors, with no sacrifice or no significant sacrifice in the quality of the polyurethane foams produced from such formulations.

As we have stated above, the neutralization of the basic catalyst, particularly potassium hydroxide, in the polyether polyols as produced is effected by oleic acid, or by oleic acid and a higher alkylbenzene or alkyltoluene sulfonic acid, or a butyl or amyl alkylnaphthalene sulfonic acid. In place of oleic acid as such, tall oil fatty acids or fractions thereof high in oleic acid can be used; or commercial sources of normally liquid fatty or related acids which are high or rich in oleic acid, for instance of the order of at least 70 or 75% oleic acid, can be used.

As to the higher alkylbenzene or alkyltoluene sulfonic acids, which can be used in conjunction with oleic acid, or tall oil fatty acids or normally liquid fatty or related acids high or rich in oleic acid, the alkyl radicals may be straight chain or branched chain and may contain predominately from 9 to 16 carbon atoms, with particular usefulness where the alkyl radical contains predominately 12 carbon atoms. In general, the higher alkylbenzene or alkyltoluene sulfonic acids contain mainly one higher alkyl radical although small proportions of higher dialkyl radicals may be present.

While dodecyl benzene sulfonic acid is especially suitable in those instances in which it is used in conjunction with oleic acid to effect neutralizations as described, other higher alkylbenzene or alkyltoluene sulfonic acids which can be used are the sulfonic acids of nonylbenzene, decylbenzene, undecylbenzene, tridecylbenzene, tetradecylbenzene, pentadecylbenzene and hexadecylbenzene; as well as the sulfonic acids of the corresponding alkyltoluenes.

In those intances where the neutralization is effected with oleic acid, or oleic acid rich acid mixtures, or with said acid in conjunction with higher alkylbenzene or alkyltoluene sulfonic acids, or with butyl- or amylnaphthalene sulfonic acids, it is important that the neutralized basic catalyst be soluble in the polyether polyol, and this requirement obtains whatever the basic catalyst may be that may have been employed in the preparation of the polyether polyols. If such solubility does not exist, then the present invention is not applicable to such a situation. In those instances where both oleic acid and higher alkylbenzene or alkyltoluene sulfonic acids, or the aforesaid alkylnaphthalene sulfonic acids, are used to effect the neutralization, the relative amounts of the oleic acid and the higher alkylbenzene or alkyltoluene sulfonic acid, or said alkylnaphthalene sulfonic acid, are variable, commonly being equal, or, in certain instances, somewhat greater for the oleic acid, or somewhat greater for the higher alkylbenzene or alkyltoluene sulfonic acid, or alkylnaphthalene sulfonic acid, although in at least most instances not substantially less than half of the free basic catalyst, say potassium hydroxide, is neutralized with oleic acid and the substantial balance by the higher alkylbenzene or alkyltoluene sulfonic acid or alkylnaphthalene sulfonic acid. The neutralization need not be to exact neutrality and commonly, for instance, the product or composition after neutralization may have an apparent slight titratable acidity, of the order of about 0.05 meg/g, or may have a pH just under 7.

The polyether polyols, the preparation of the specially neutralized compositions of which are involved in the present invention, are, generally, well known to the art. They include linear as well as branched chain polyether polyols and they may be of strictly aliphatic character or of aromatic-aliphatic character. Illustrative examples thereof, which are shown in many patents, illustrative of which are U.S. Pat. Nos. 2,674,619; 2,866,774; 3,291,845; 3,682,845 and 3,702,582, the disclosures with respect to which polyether polyols are incorporated herein by reference, are polytetramethylene ether glycol, polypentamethylene ether glycol, polyhexamethylene ether glycol, poly 4-phenyl hexamethylene ether glycol, polyethylene-propylene ether glycol; alkylene oxide adducts of such aliphatic di- and polyhydric alcohols as, for example, ethylene glycol, diethylene glycol and higher polyethylene glycols, propylene glycol, butylene glycol, diglycerol and higher polyglycerols, pentaerythritol, sorbitol, sorbide, mannitol, trimethylol propane, trimethylolbenzene, trimethylolphenols (which term generically is used to cover the monomers, dimers, trimers and tetramers), and mixtures of two or more thereof, and the like. The polyether polyols are conventionally prepared, as indicated above, by adducting the di- and polyhydric alcohols with alkylene oxides or α-epoxides such as ethylene oxide, propylene oxide, butylene oxides, or mixtures of such oxides such as ethylene oxide and propylene oxide, or by first adducting the di- or polyhydric alcohol with ethylene oxide and then with propylene oxide, or vice versa. Other alkylene oxide and other α-epoxides can be used but, from the standpoint of cost, commercial availability, and for other reasons as well, the principal alkylene oxides commercially used at present for adduction with the di- and polyhydric alcohols to produce the polyether polyols are ethylene oxide and propylene oxide. As previously stated, such adductions are commonly carried out in the presence of alkaline or basic catalysts, most commonly potassium hydroxide. The polyether polyols may be of low, intermediate, or of high molecular weight, and these and other factors play a significant role, as is well known to the art, as to whether rigid or flexible polyurethane foams are produced when said polyether polyols are reacted with di- or polyisocyanates for the production of said foams. Typical molecular weights of polyether polyols used in making polyurethane foams are 450 to 600, and 1,000 to 1,200 or more.

Our invention is generally applicable to the polyether polyols broadly, where an alkaline or basic catalyst, particularly potassium hydroxide, has been used in their preparation, but is especially applicable to the neutralization of the oxyalkated trimethylol phenols, and particularly the propoxylated polymethylol phenols, which are disclosed in U.S. Pat. No. 3,682,845, the disclosures of which, in relation to the matters here involved, are incorporated herein by reference. In the case of said oxyalkylated trimethylol phenols in particular, where both oleic acid and a higher alkylbenzene sulfonic acid are used for the neutralization, not only are the aforesaid advantages of the neutralization obtained but, in addition, the presence of the higher alkylbenzene or alkyltoluene sulfonic acid moiety also improves the solubility of the oxyalkylated trimethylol phenol in higher molecular weight polyols and Freons which are commonly used in polyurethane foam formulations particularly for the production of rigid foams.

The di- and polyisocyanates which are used for the production of the polyurethane foams, utilizing the specially neutralized polyether polyols of, and produced in accordance with, our present invention, are well known to the art and require no extensive recitation. They include, among others, tolylene 2,4-diisocyanate; tolylene 2,6-diisocyanate; 80-20 mixtures of the 2,4- and 2,6-tolylene diisocyanates as well as mixtures of said 2,4- and 2,6-tolylene diisocyanates in different ratios as, for instance, 65-35 mixtures; diphenylmethane-4,4'-diisocyanate; 4,4'-methylene bis cyclohexyl diisocyanate; isophorone diisocyanate; polymethylene polyphenylisocyanates sold under the trademarks PAPI, such as PAPI 27, PAPI 135 and PAPI 901 (Upjohn Polymer Chemicals); and naphthalene triisocyanate.

In the production of the polyurethane foams, utilizing the specially neutralized polyether polyols, the latter are employed in formulations and reacted with di- or polyisocyanates in accordance with procedures or techniques which are per se well known to the art as disclosed in various patents such as, for instance, U.S. Pat. Nos. 3,072,582; 3,245,924; 3,265,641; and 3,682,845. Similarly, where extraneous catalysts are used, they, as well as emulsifiers, stabilizers, foaming systems, including one-shot procedures and procedures by the prepolymer route for the production of polyurethane foams can be used and are shown in certain of the aforesaid patents as well as in such patents as U.S. Pat. Nos. 2,949,431; 2,948,691; 3,026,275; 3,036,021; 3,049,513 and 3,078,239. The disclosures of said patents in this paragraph as to the aforesaid matters are incorporated herein by reference.

Similarly, numerous formulations for the production of polyurethane foams, rigid and flexible, are known to the art, are disclosed in numerous patents and other publications, and no patentable invention herein is predicated on any particular formulations per se except in so far as they involve the use of the specially neutralized polyether polyols of the present invention.

The following examples are illustrative of the practice of our invention but they are in no way to be construed as limitative thereof since numerous other polyether polyols can be made, and involving the use of various alkaline or basic catalysts, utilizing the novel principle and guiding principles and teachings contained herein; and various rigid and flexible polyurethane foams can be made from such specially neutralized polyether polyols, taking advantage of the ability in certain cases to obviate the necessity for using expensive catalysts such as many of those currently in commercial use or making possible the use of lesser proportions of such expensive catalysts without adversely or materially adversely affecting the quality and desired properties of the polyurethane foams. All parts listed are by weight, and all temperatures recited are in degrees Centigrade.

EXAMPLE 1

|  | Parts |
| --- | --- |
| Phenol (90%) | 313.2 |
| Formaldehyde (37%) | 729.7 |
| Propylene oxide | 675 |
| Potassium hydroxide (50% aqueous solution) | 31 |

In a closed reactor fitted with a stirrer, thermometer and cooling and heating means, there are added the phenol and formaldehyde which are heated together to about 75°, and 21 parts of the potassium hydroxide are added, while maintaining said temperature of about 75°, and the resulting mixture is held at this temperature for 2 hours. It is then cooled to about 60° and 350 parts of the propylene oxide gradually is added over a period of about 6 hours, the pH rising from about 9 to about 12. The reaction mixture is then heated to about 120° under vacuo to reduce the moisture content to about 1% or less. Then the remaining 10 parts of potassium hydroxide are added and, again, the mixture is heated at about 120° under vacuo to reduce the moisture content to about 1% or below. The remaining 325 parts of propylene oxide are then gradually added over a period of about 5 hours while maintaining the temperature of the reaction mixture at about 120°. The yield of the resulting polyol ether, in the form of a propoxylated polymethyl phenol, is 1175 parts. The product has a hydroxyl (OH) number of 495 (or a hydroxy value of 8.84 meg/g), and a base content of 0.07 milli-equivalents/g. The said polyether polyol product is divided into three portions, A, B and C, each containing 100 parts, and treated in the manner described below:

A. To 100 parts there is added 2 parts of oxalic acid at 100° and the product is then filtered. On analysis, it shows an OH number of 495, an acid number of 1.0, 100 ppm of potassium, and a pH of 4.5.

B. To 100 parts there is added 5 parts of oleic acid, and the resulting product, on analysis, shows an acid number of 2.2, and a pH of 7.

C. To 100 parts there is added 2.5 parts of dodecylbenzene sulfonic acid and 2.5 parts of oleic acid, and the resulting product, on analysis, shows an acid number of 2.8 and a pH of 6.8.

The foregoing A, B and C polyether polyol products, treated as described, are then each utilized in the following formulation for testing their usefulness for producing rigid polyurethane foams:

|  | Parts |
| --- | --- |
| Polyol polyether | 60 |
| Silicone Surfactant L 5420[1] | 0.8 |
| Water | 0.2 |
| Freon 11 | 23 |
| PAPI 901[2] | 79 |

[1]Hydrolyzable silicone-glycol copolymer surfactant
[2]Polymethylene polyphenylisocyanate The first four ingredients are stirred together until homogeneous. The isocyanate is then added and the mixture is stirred for about 15 seconds and poured into a box. The results are tabulated below. Since polyether polyol A could not be foamed by the above formulation, sufficient amine catalyst is added so that a foam can be prepared. The formulation to make such foam is as follows:

|  | Parts |
| --- | --- |
| Polyether polyol A | 60 |
| Silicone Surfactant L 5420 | 0.8 |
| Water | 0.2 |
| Dimethylethanolamine | 0.5 |
| Dabco LV33[3] | 0.5 |
| Freon 11 | 23 |
| PAPI 901 | 79 |

[3]33% solution of triethylenediamine in dipropyleneglycol.

The procedure used in preparing the polyurethane foam is the same as set forth above. The foam sought to be prepared from polyether polyol A by the first polyurethane formulation set forth above is denoted below as $A_1$; and the foam sought to be prepared from polyether polyol A by the second polyurethane formulation set forth above is denoted below as $A_2$. It will be noted that said two formulations differ only in that the second formulation contains amine catalysts, namely, dimethylethanolamine and Dabco LV33. The following Table I describes briefly the results of said tests:

Table I

| | Seconds Cream Time | Seconds Rise Time | |
| --- | --- | --- | --- |
| $A_1$ | — | — | Complete collapse |
| $A_2$ | 80 | 450 | Fine cell, rather friable |
| B | 30 | 70 | Fine cell, non-friable |
| C | 70 | 220 | Fine cell, non-friable |

EXAMPLE 2

A polyether polyol is prepared in conventional manner, in the presence of potassium hydroxide as a catalyst, by first gradually adding propylene oxide to glycerol to obtain a hydroxyl value of 50, and then adding ethylene oxide to obtain a hydroxyl value of 45. When this polyether polyol is mixed with the A product of Example 1, a cloudy mixture is obtained that starts to separate within a few hours.

When the polyether polyol of this Example 2 is neutralized with oleic acid and dodecylbenzene sulfonic acid as in the C product of Example 1, a clear mixture is obtained that shows no separation after several months. This neutralized polyether polyol is then formulated as follows to produce a polyurethane foam:

|  | Parts |
| --- | --- |
| Neutralized polyether polyol | 100 |

-continued

| | Parts |
|---|---|
| Water | 0.05 |
| FREON F-11 | 2.00 |
| Tetramethyl butane diamine | 1.00 |
| Tin catalyst UL2[4] | 0.05 |
| Silicone Surfactant L5303[5] | 1.00 |
| PAPI 27 | 54.1 |

[4]Organotin carboxylated catalyst (Witco Chemical Corporation)
[5]Non-hydrolyzable silicone-glycol copolymer surfactant The first five ingredients are mixed together and metered into a mixing head as one stream, and the isocyanate metered in as a second stream. A fine celled foam is obtained with the characteristics as shown in the following Table II.

Table II

| Cream time | 15 sec. |
|---|---|
| Rise time | 60 sec. |
| Tack free time | 40 sec. |
| Free blow density | 12.2 lb./cu.ft. |

When poured into a mold, excellent mold replication is obtained over a range of about 15 to 35 lbs./cu.ft. Demold time is about 2½ minutes and no breakage is encountered at the undercut parts of the mold.

EXAMPLE 3

A polyether is prepared from sorbitol and propylene oxide by conventional means, using potassium hydroxide as a catalyst, to a hydroxyl number of 500. The final alkalinity is 0.05 meq/g. It is divided into two parts. One part is treated with magnesium silicate to remove the potassium hydroxide. To the other part is added 1.5% oleic acid and 1.5% dodecylbenzene sulfonic acid. The analyses are given below:

| | Magnesium Silicate Treated | Neutralized 1.5% Oleic Acid - 1.5% Dodecylbenzene Sulfonic Acid |
|---|---|---|
| Hydroxyl number | 500 | 490 |
| Acid number | 0.5 | 0.2 |
| Potassium | 10 ppm | — |
| pH | 6.5 | 7.1 |

These two polyether polyol samples are foamed in the first formulation given in Example 1, namely:

| | Parts |
|---|---|
| Polyether polyol | 60.0 |
| Silicone Surfactant L5420 | 0.8 |
| Water | 0.2 |
| Freon 11 | 23 |
| Polymeric Isocyanate 901 | 79 |

A satisfactory foam is obtained with the sample neutralized with dodecylbenzene sulfonic acid and oleic acid, but no foam is obtained from the magnesium silicate treated sample, except by the addition of amine catalysts as in the second polyurethane formulation of Example 1.

The foregoing Examples 1 and 3 show that good polyurethane foams are obtained through the oleic acid, and the oleic acid — dodecylbenzene sulfonic acid combination, neutralization of the polyether polyols, when such polyether polyols are used to produce polyurethane foams without the necessity for the use of any additional catalysts in the polyurethane formulations, thus obviating the necessity for the use of expensive amine catalysts such as those illustratively recited above. This represents the extreme case. In other instances, the oleic acid neutralized, and the oleic acid — dodecylbenzene sulfonic acid combination neutralized polyether polyols can be used in polyurethane formulations to produce polyurethane foams wherein the foregoing amine catalysts, or other known catalysts, are used but the amounts of such amine catalysts, or other known catalysts, which are utilized are materially smaller than would otherwise be used in particular formulations, for instance, of the order of 20 to 60%, or so, of the usual amounts of such conventional expensive catalysts, depending upon the particular polyurethane formulations involved and the particular results sought to be obtained with respect to the polyurethane foams.

Additional illustrative examples of the preparation of polyether polyols in accordance with our present invention are set forth below.

EXAMPLE 4

A propoxylated polymethylol phenol is prepared, according to the procedure disclosed and claimed in U.S. Pat. No. 3,682,845, using sodium hydroxide as a catalyst, said polyether polyol having a hydroxyl number of 400 and an alkalinity of 0.05 meg/g, except that neutralization is effected with equal parts of oleic acid and dodecylbenzene sulfonic acid in an amount totaling 4% by weight of the polyether polyol.

EXAMPLE 5

820 parts trimethylolethane, 820 parts trimethylolpropane, and 2 parts potassium hydroxide are mixed together and placed in an autoclave heated to a temperature of 135°. Ethylene oxide gas is then gradually introduced, over a period of 3 hours, into the mixture in the autoclave, while maintaining the aforesaid temperature, until a total of 1160 parts are introduced, a pressure of about 25 pounds per square inch being maintained in the autoclave during the ethoxylation reaction. The resulting product is divided into two equal parts, one part being neutralized with oleic acid, and the other part being neutralized with a mixture of equal parts of oleic acid and dodecylbenzene sulfonic acid.

EXAMPLE 6

492 parts of pentaerythritol, 1148 parts of trimethylolpropane, and 1 part sodium hydroxide are mixed together and heated to 150°. Ethylene oxide gas is then gradually introduced, over a period of 3 hours, into the mixture in the autoclave, while maintaining a temperature of about 135°-150°, until a total of about 1160 parts are introduced, a pressure of about 25 to 50 pounds per square inch being maintained in the autoclave during the ethoxylation. The resulting product is divided into two equal parts, one part being neutralized with tall oil fatty acids, and the other part being neutralized with a mixture of tall oil fatty acids and dodecyltoluene sulfonic acid in a weight ratio of 2 of the former to 1 of the latter.

EXAMPLE 7

In a stirred reactor there are placed 2650 parts of 37% formaldehyde and 1205 parts of 85% phenol, the reactor contents are heated to 90°, and 30 parts of potassium hydroxide are added over a period of ½ hour while maintaining the contents at about 90°. The reactor contents are then maintained at said temperature for about an additional hour. Then the contents are cooled rapidly to about 60°, and 1265 parts of propylene oxide are added over a period of about 5 hours, while maintaining the reaction mixture at about 60°, and the reaction is continued until conversion to hydroxypropyl ether groups. The reactor is then placed under vacuum, the temperature is raised to about 125° C. and maintained under such temperature until the moisture content is less than 0.1%. An additional 80 parts of 50% potassium hydroxide is then added and 2140 parts of propylene oxide are added over a period of about 10 hours, at said temperature of about 125° C. or slightly less. After the propylene oxide has reacted, the reaction product is stripped under vacuo. The resultant propoxylated polymethylol phenol is divided into five equal parts, (a), (b), (c), (d) and (e) and treated as follows:

(a) It is neutralized with oleic acid.

(b) It is neutralized with tall oil fatty acids.

(c) It is neutralized with a mixture of equal parts by weight of oleic acid and hexadecylbenzene sulfonic acid.

(d) It is neutralized with a mixture of tall oil fatty acids and hexadecyltoluene sulfonic acid in a weight ratio of 3 of the former and 1 of the latter.

(e) It is neutralized with a mixture of oleic acid and amylnaphthalene sulfonic acid in a weight ratio of 4 of the former to 1 of the latter.

We claim:

1. In that process for the preparation of normally liquid polyether polyols which are useful in the production of polyurethane foams, and wherein a di- or polyhydric alcohol is reacted with an alkylene oxide or α-epoxide in the presence of a basic catalyst, the improvement which comprises, after completion of the reaction to produce the polyether polyol, and without otherwise removing said basic catalyst, neutralizing said basic catalyst with at least one member of the group consisting of oleic acid and tall oil fatty acids alone, or in conjunction with a sulfonic acid which is a higher molecular weight alkylbenzene or alkyltoluene, or a butyl- or amylnaphthalene, sulfonic acid.

2. The process of claim 1, in which the basic catalyst is potassium hydroxide.

3. The process of claim 2, in which the alkylene oxide or epoxide is ethylene oxide or propylene oxide, and the sulfonic acid is dodecylbenzene sulfonic acid.

4. The process of claim 3, in which the polyether polyols are ethoxylated or propoxylated trimethylol phenols.

5. The process of claim 3, in which the polyether polyols are oxyalkylated polymethylol phenols.

6. The process of claim 3, in which the polyether polyols are propoxylated trimethylol phenols.

7. The process of claim 1, in which the sulfonic acid is a dodecylbenzene sulfonic acid.

8. In that process for the preparation of normally liquid polyether polyols in the form of propoxylated trimethylol phenols which are useful in the production of polyurethane foams, and wherein a trimethylol phenol is reacted with propylene oxide in the presence of potassium hydroxide as a catalyst, the improvement which comprises, after completion of the reaction to produce said polyether polyol, and without otherwise removing said catalyst, neutralizing said potassium hydroxide with oleic acid or with oleic acid in conjunction with a dodecylbenzene sulfonic acid.

9. A normally liquid polyether polyol composition useful for the production of polyurethane foams, said polyether polyol containing the neutralization product resulting from neutralization of a basic catalyst, previously utilized in and unremoved from the preparation of said polyether polyol, with oleic acid or tall oil fatty acids alone or in conjunction with a sulfonic acid which is a higher molecular weight alkylbenzene or alkyltoluene sulfonic acid, or a butyl- or amylnaphthalene sulfonic acid.

10. A composition according to claim 9, in which the basic catalyst is potassium hydroxide.

11. A composition according to claim 10, in which the polyether polyol is an alkylene oxide or α-epoxide adduct of a di- or polyhydric alcohol, and the sulfonic acid is dodecylbenzene sulfonic acid.

12. A composition according to claim 11, in which the polyether polyol is an ethylene oxide or propylene oxide adduct of a trimethylol phenol.

13. A composition according to claim 11, in which the polyether polyol is an oxyalkylated polymethylol phenol.

14. A composition according to claim 11, in which the polyether polyol is a propoxylated trimethylol phenol.

15. A composition according to claim 9, in which the sulfonic acid is a dodecylbenzene sulfonic acid.

16. A normally liquid polyether polyol composition useful for the production of polyurethane foams, said polyether polyol being in the form of a propoxylated trimethylol phenol, containing the neutralization product of potassium hydroxide, previously utilized in and unremoved from the preparation of said polyether polyol, with oleic acid, or with oleic acid and a dodecylbenzene sulfonic acid.

17. A polyurethane foam composition comprising the reaction product of an organic polyisocyanate and a normally liquid polyether polyol, said polyether polyol being the neutralization product resulting from the neutralization of a basic catalyst, previously used in and unremoved from the preparation of said polyether polyol, with oleic acid or tall oil fatty acids alone or in conjunction with a sulfonic acid which is a higher molecular weight alkylbenzene or alkyltoluene sulfonic acid, or a butyl- or amylnaphthalene sulfonic acid.

18. The foam composition of claim 17, in which the basic catalyst is potassium hydroxide.

19. The foam composition of claim 18, in which the polyether polyol is an alkylene oxide or α-epoxide adduct of a di- or polyhydric alcohol, and the sulfonic acid is dodecylbenzene sulfonic acid.

20. The foam comosition of claim 19, in which the polyether polyol is an ethylene oxide or propylene oxide adduct of a trimethylol phenol.

21. The foam composition of claim 19, in which the polyether polyol is an oxyalkylated polymethylol phenol.

22. The foam composition of claim 19, in which the polyether polyol is a propoxylated trimethylol phenol.

23. The foam composition of claim 18, in which the sulfonic acid is a dodecylbenzene sulfonic acid.

24. A polyurethane foam composition comprising the reaction product of an organic polyisocyanate and a normally liquid polyether polyol in the form of propoxylated trimethylol phenols and wherein a trimethylol phenol is reacted with propylene oxide in the presence of potassium hydroxide as a catalyst, said polyether polyol being the neutralization product resulting from neutralization of said potassium hydroxide, previously utilized in and unremoved from the preparation of said polyether polyol, with oleic acid or with oleic acid in conjunction with a dodecylbenzene sulfonic acid.

* * * * *